(12) United States Patent
Konishi

(10) Patent No.: US 8,612,081 B2
(45) Date of Patent: Dec. 17, 2013

(54) VEHICLE

(75) Inventor: Yasuhiro Konishi, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/811,976

(22) PCT Filed: Jul. 25, 2011

(86) PCT No.: PCT/JP2011/066863
§ 371 (c)(1),
(2), (4) Date: Jan. 24, 2013

(87) PCT Pub. No.: WO2012/014845
PCT Pub. Date: Feb. 2, 2012

(65) Prior Publication Data
US 2013/0173106 A1    Jul. 4, 2013

(30) Foreign Application Priority Data
Jul. 26, 2010    (JP) .................................. 2010-166837

(51) Int. Cl.
*B60L 9/00*    (2006.01)

(52) U.S. Cl.
USPC .......................................................... 701/22

(58) Field of Classification Search
USPC ........................................................... 701/22
See application file for complete search history.

(56) References Cited

U.S. PATENT DOCUMENTS

| | | | |
|---|---|---|---|
| 2010/0198438 A1* | 8/2010 | Iraha et al. | 701/22 |
| 2012/0178584 A1* | 7/2012 | Andri | 477/3 |
| 2012/0226404 A1* | 9/2012 | Leone | 701/22 |

FOREIGN PATENT DOCUMENTS

| | | | |
|---|---|---|---|
| JP | 2008-302772 A | 12/2008 |
| JP | 2009-255680 A | 11/2009 |
| JP | 2010-242692 A | 10/2010 |

* cited by examiner

*Primary Examiner* — Hussein A. Elchanti
(74) *Attorney, Agent, or Firm* — Foley & Lardner LLP

(57) ABSTRACT

The present invention concerns a vehicle including a fuel tank, an engine to which fuel is supplied from the fuel tank, and a control device. The control device is characterized by notifying a refueling instruction corresponding to a use history of the vehicle. According to the present invention, the supply of extra fuel that can be degraded in the fuel tank can be prevented since a necessary refueling instruction is notified in accordance with the use history of the vehicle.

11 Claims, 8 Drawing Sheets

---

FUEL SUPPLY AMOUNT THIS TIME

18ℓ

※ IF FUEL IS NOT USED FOR LONG TIME, IT MAY POSSIBLY CAUSE ENGINE TROUBLE.
※ WHEN PLANNING A LONG-DISTANCE TRIP, SET A DESTINATION.

| INPUT DRIVING DISTANCE | SET DESTINATION | AVERAGE FUEL MILEAGE | AVERAGE ELECTRIC MILEAGE |

VEHICLE

FIELD OF THE INVENTION

The present invention relates to a vehicle.

BACKGROUND

JP2008-302772A discloses a technology for, when the degradation of fuel in a fuel tank is detected in a hybrid vehicle configured to be rechargeable from the outside of the vehicle, notifying a passenger that the fuel has degraded. According to the technology disclosed in JP2008-30772A, the exchange of the fuel can be prompted to the passenger by notifying the passenger of the deterioration of a fuel property.

SUMMARY

However, since the fuel degraded in the fuel tank needs to be discarded in the technology disclosed in JP2008-302772A, there has been a problem of wasting the fuel.

The present invention was developed in view of such a technical problem and an object thereof is to provide a vehicle capable of preventing the supply of extra fuel that can be degraded in a fuel tank.

To achieve the above object, the present invention is directed to a vehicle, characterized by including a fuel tank, an engine to which fuel is supplied from the fuel tank, and a control device, the control device notifying a refueling instruction corresponding to a use history of the vehicle.

An embodiment and advantages of the present invention are described in detail below with reference to the accompanying drawings.

DETAILED DESCRIPTION

Hereinafter, an embodiment of the present invention is described with reference to the accompanying drawings.

Figure 1:
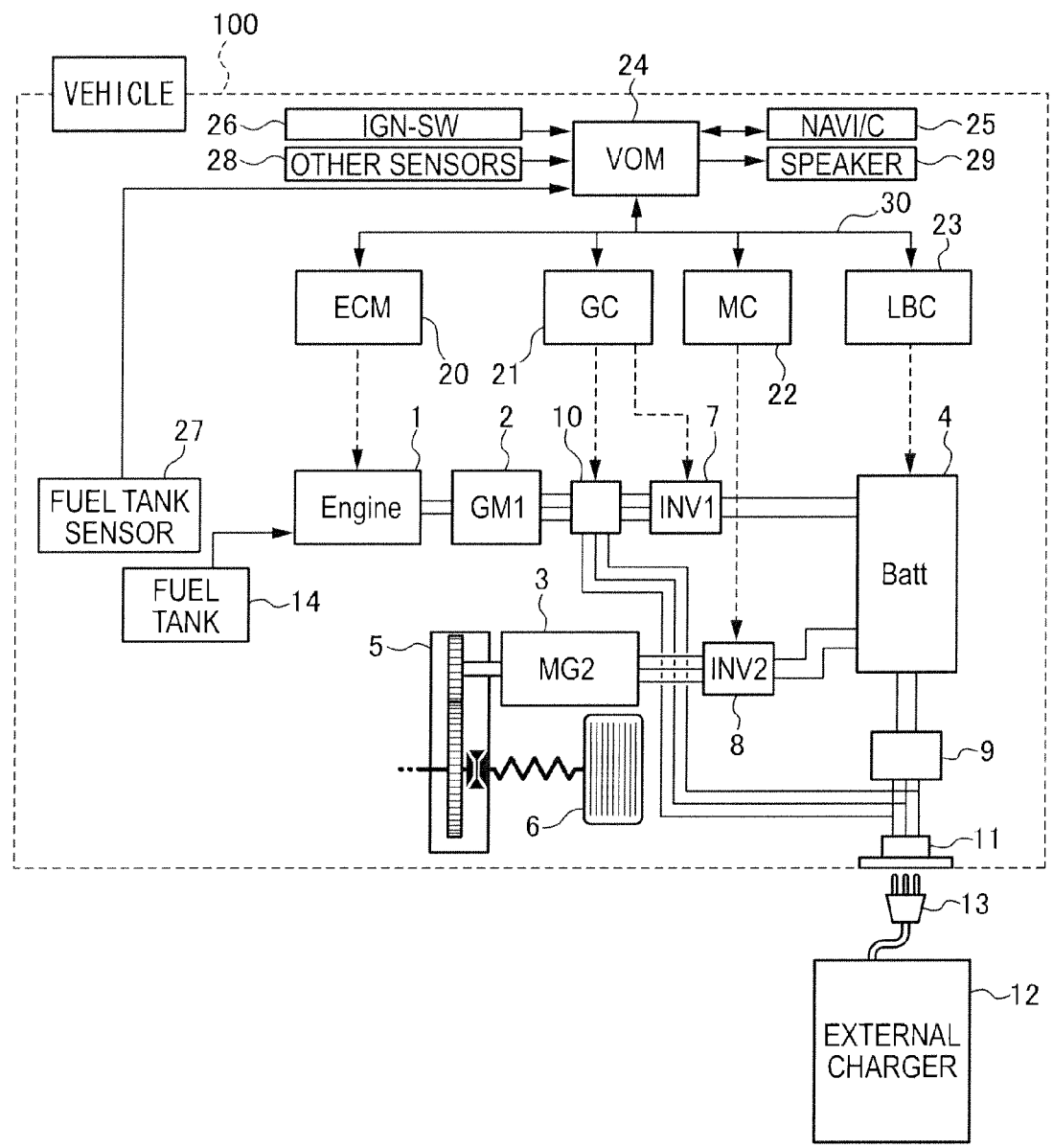
FIG. 1 is an overall system diagram showing an electric vehicle according to an embodiment of the present invention.

FIG. 1 is an overall system diagram showing an electric vehicle 100 according to an embodiment of the present invention. In FIG. 1, a series-type plug-in hybrid vehicle is shown as an example of the electric vehicle 100. It should be noted that the electric vehicle is not limited to the series-type plug-in hybrid vehicle and can be any vehicle including an engine and a motor and using at least the motor as a drive source. For example, the electric vehicle may be a parallel-type plug-in hybrid vehicle or the like.

A drive system of the electric vehicle 100 shown in FIG. 1 includes an engine 1, a power generating motor 2 (motor), a drive motor 3, a high-current battery 4, a reducer differential mechanism 5, drive wheels 6, an inverter for power generating motor 7, an inverter for drive motor 8, a charge converter 9, a switcher 10, a charging port 11 and a fuel tank 14.

This vehicle has an electric vehicle driving mode (hereinafter, referred to as an "EV driving mode") and a hybrid vehicle driving mode (hereinafter, referred to as an "HEV driving mode"). The EV driving mode is a mode in which the drive motor 3 is driven by power accumulated in the high-current battery 4, the vehicle drives using only the drive motor 3 as the drive source and the engine 1 is not operated. On the other hand, the HEV driving mode is a mode in which the engine 1 is operated for charging and the like while the vehicle drives using the drive motor 3 as the drive source.

The engine 1 is started by the power generating motor 2 when a power generation request is made, and power is generated by driving the power generating motor 2 after complete explosion. The engine 1 and the power generating motor 2 are stopped when a transition is made from a state where the power generation request is present to a state where the power generation request is absent.

The power generating motor 2 is a motor generator which is coupled to the engine 1 and fulfills a motor function and a power generation function. The motor function is fulfilled when the power of the high-current battery 4 is consumed and the engine 1 is started by being ignited following the cranking of the engine 1 when a power generation request is made in a state where the engine 1 is stopped. The power generation function is fulfilled when rotational drive power is received from the engine 1 and converted into three-phase alternating-current power and generated power is charged into the high-current battery 4 when the engine 1 is in a driven state.

The drive motor 3 is a motor generator which is connected to the drive wheels 6 of the vehicle via the reducer differential mechanism 5 and fulfills a motor function and a power generation function. The motor function is fulfilled when the vehicle is driven by consuming the power of the high-current battery 4 during startup acceleration, constant-speed driving, mid-speed acceleration and the like. The power generation function is fulfilled when rotational drive power is received from the drive wheels 6 during deceleration, braking or the like and converted into three-phase alternating-current power and regenerative power generation is performed to charge generated power into the high-current battery 4.

A lithium-ion secondary battery, a high-capacity capacitor or the like is used as the high-current battery 4. Power generated by the power generating motor 2 and power regenerated by the drive motor 3 are accumulated in the high-current battery 4, which supplies the accumulated power to the drive motor 3 and the power generating motor 2.

The inverter for power generating motor 7 is arranged between the power generating motor 2 and the high-current battery 4 and converts a three-phase alternating current and a direct current from one to the other. The three-phase alternating current is used for the drive and power generation of the power generating motor 2 and the direct current is used for the charge and discharge of the high-current battery 4.

The inverter for drive motor 8 is arranged between the drive motor 3 and the high-current battery 4 and converts a three-phase alternating current and a direct current from one to the other. The three-phase alternating current is used for the drive and power generation of the drive motor 3 and the direct current is used for the charge and discharge of the high-current battery 4.

The charge converter 9 is arranged between the high-current battery 4 and the charging port 11 and converts alternating-current external power supplied from the charging port 11 into direct-current power chargeable into the high-current battery 4 during plug-in charging.

The switcher 10 is arranged between the power generating motor 2, the inverter for power generating motor 7 and the charging port 11 and switches a power generation path/power supply path. The power generation path is a pattern for separating the charging port 11 and connecting the power generating motor 2 and the inverter for power generating motor 7. Any one of the following three patterns is selected as the power supply path.
- A pattern for using power of the high-current battery 4 by separating the charging port 11 and connecting the power generating motor 2 and the inverter for power generating motor 7.
- A pattern for using power of both the charging port 11 and the high-current battery 4 by connecting the power generating motor 2, the inverter for power generating motor 7 and the charging port 11.
- A pattern for using power of the charging port 11 by separating the inverter for power generating motor 7 and connecting the power generating motor 2 and the charging port 11.

The charging port 11 is set at an outer peripheral position of a vehicle body. When the vehicle is stopped at a position where an external charger 12 is installed, a lid or the like is opened in this stopped state and a power supply plug 13 of the external charger 12 is inserted for connection, and the high-current battery 4 is charged (plug-in charging) via the charge converter 9. Here, the external charger 12 means a home charging system for low-speed charging using midnight power at home, a quick charging station enabling quick charging on the go away from home.

The fuel tank 14 is a device for storing fuel to be supplied to the engine 1. The fuel stored in the fuel tank 14 is supplied to the engine 1 via a fuel supply path and a fuel injector (both are not shown in FIG. 1).

A control system of the electric vehicle 100 shown in FIG. 1 includes an engine controller (ECM) 20, a generator controller (GC) 21, a motor controller (MC) 22, a battery controller (LBC) 23, a vehicle integrated controller (VCM) 24, a navigation controller (NAVI/C) 25, an ignition switch (IGN-SW) 26, a fuel tank sensor 27, other sensors 28 and a speaker 29. It should be noted that each controller 20, 21, 22, 23, 24 is connected by a CAN communication line 30 capable of information exchange so that various data can be shared. Further, each controller 20, 21, 22, 23, 24 includes a processor for executing a program, a memory storing the program to be executed by the processor and an interface connected to the processor.

The engine controller 20 controls an output torque by managing an intake air amount, an ignition timing and a fuel injection amount of the engine 1 in accordance with a control command from the vehicle integrated controller 24.

The generator controller 21 manages the inverter for power generating motor 7 to control input and output torques of the power generating motor 2 in accordance with a control command from the vehicle integrated controller 24.

The motor controller 22 manages the inverter for drive motor 8 to control input and output torques of the drive motor 3 in accordance with a control command from the vehicle integrated controller 24.

The battery controller 23 estimates internal state quantities of the high-current battery 4 such as a charging rate (charging capacity) and inputtable/outputtable power and executes a protection control for the high-current battery 4. Hereinafter, the charging rate (charging capacity) of the high-current battery 4 is referred to as a battery SOC (SOC is an abbreviation of "State Of Charge").

The vehicle integrated controller 24 controls a motor drive output in accordance with a driver' request while coordinating a plurality of controllers 20, 21, 22 and 23 based on shared various data. Further, the vehicle integrated controller 24 controls a power generation output while taking both driving performance and fuel mileage (economic efficiency) into account. This vehicle integrated controller 24 receives information from the navigation controller 25, the ignition switch 26, the fuel tank sensor 27 and the other sensors 28 and outputs information, which should be notified to passengers including the driver, to the navigation controller 25 and the speaker 29.

The navigation controller 25 detects the position of the own vehicle using a GPS signal from a satellite and searches and guides a path to a destination based on map data stored in a DVD or the like. The own vehicle position information on a map obtained by the navigation controller 25 is supplied to the vehicle integrated controller 24 together with home position information and charging station position information. This navigation controller 25 includes an input device (input means) used by the passenger to input various pieces of information. The passenger can input a destination and a planned driving distance using the input device.

The ignition switch 26 is a switch of an ignition device of the engine 1. This ignition switch 26 doubles as a switch of a starter motor (cell motor). The fuel tank sensor 27 is a sensor for detecting the remaining amount of the fuel stored in the fuel tank 14 and, for example, is a fuel level gauge. The other sensors 28 are various sensors such as an accelerator pedal opening sensor and a wheel speed sensor. The speaker 29 is a device for outputting a sound.

Figure 2:
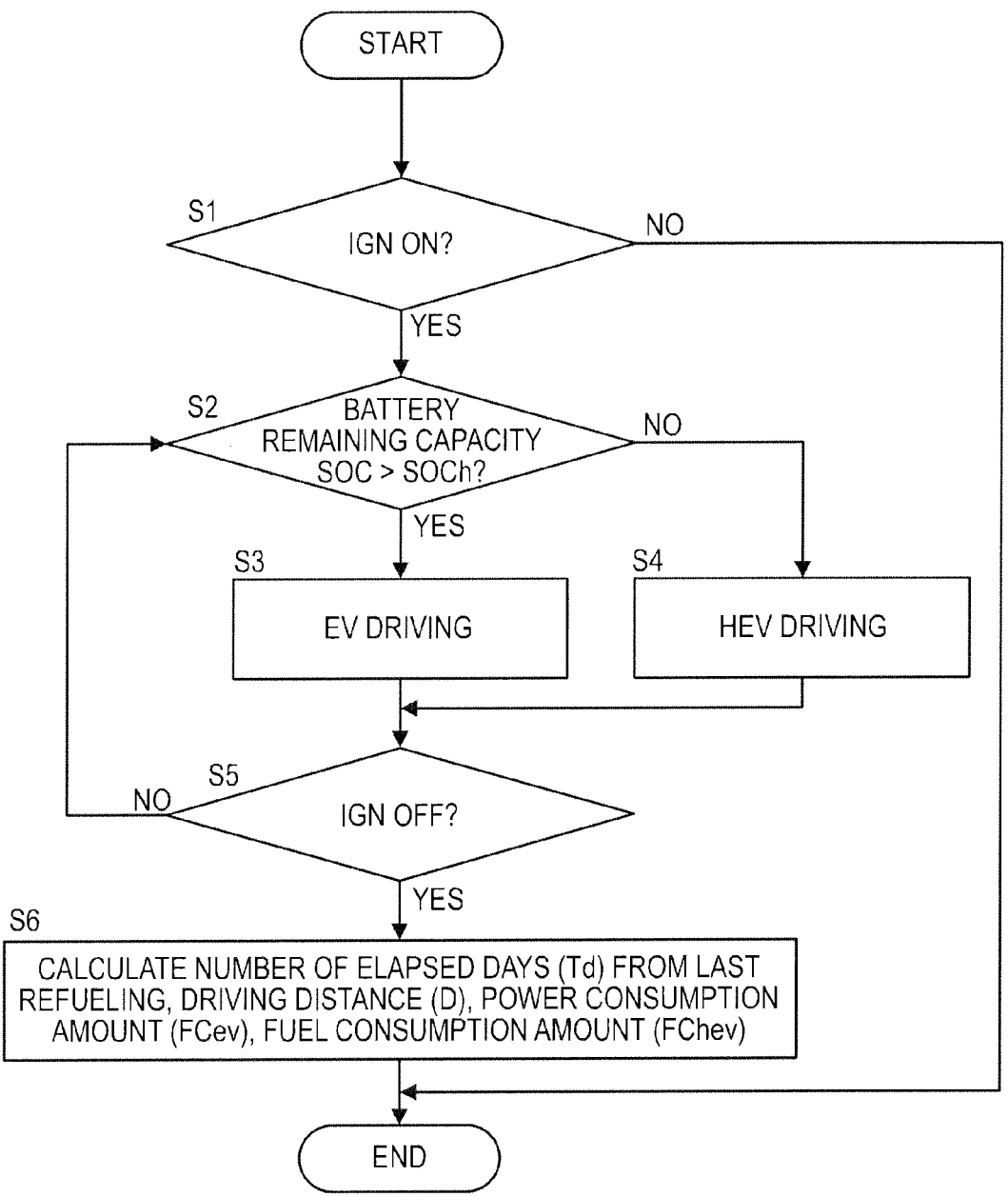
FIG. 2 is a flow chart showing a control logic for calculating electric mileage during EV driving and fuel mileage during HEV driving in the electric vehicle according to the embodiment of the present invention.

FIG. 2 is a flow chart showing a control logic for calculating electric mileage during EV driving and fuel mileage during HEV driving in the electric vehicle 100 according to the embodiment of the present invention. It should be noted that, in the following description, the respective controllers 20, 21, 22, 23 and 24 are collectively called a "controller 31" (corresponding to a control device).

First, in Step S1, the controller 31 determines whether the ignition switch 26 is on or off (S1). If the ignition switch 26 is on (YES in Step S1), the controller 31 determines whether or not a battery remaining capacity SOC (remaining capacity of the high-current battery 4 at present) is larger than a threshold value SOCh (an SOC lower limit value below which a transition is made to the HEV driving mode) (S2). On the other hand, if the ignition switch 26 is off (NO in S1), the process is finished.

If SOC is larger than SOCh (YES in S2), the controller 31 controls so that the electric vehicle 100 drives in the EV driving mode since the transition to the HEV driving mode is not necessary. On the other hand, if SOC is smaller than SOCh (NO in S2), the controller 31 controls so that the electric vehicle 100 drives in the HEV driving mode since the transition to the HEV driving mode is necessary.

Thereafter, the controller 31 determines whether the ignition switch 26 is off or on (S5). If the ignition switch 26 is on (NO in Step S5), a return is made to Step S2 to repeat the process. On the other hand, if the ignition switch 26 is off (YES in Step S5), a transition is made to Step S6.

When a transition is made to Step S6, the controller 31 calculates the number of elapsed days (Td, unit "day") from the last refueling (refueling was recognized), a driving distance per trip (D, unit "km"), a power consumption amount used for EV driving (FCev, unit "kWh"), and a fuel consumption amount used for HEV driving (FChev, unit "L") and store them in the memory (S6).

Further, in Step S6, the controller 31 calculates electric mileage (km/kWh) during EV driving based on the amount of power (kWh) taken out from the high-current battery 4 during driving in the EV during mode and a driving distance (km) in the EV driving mode. On the other hand, a fuel consumption amount (L) is calculated by integrating a fuel injection amount from the injector during driving in the HEV driving mode, and fuel mileage (km/L) during HEV driving is calculated based on the calculated fuel consumption amount (L) and a driving distance (km) in the HEV driving mode.

By the process described above, the controller 31 calculates electric mileage during EV driving and fuel mileage during HEV driving per trip, and records the number of elapsed days from the last refueling in addition to the calculated electric mileage during EV driving and fuel mileage during HEV driving.

Figure 3:
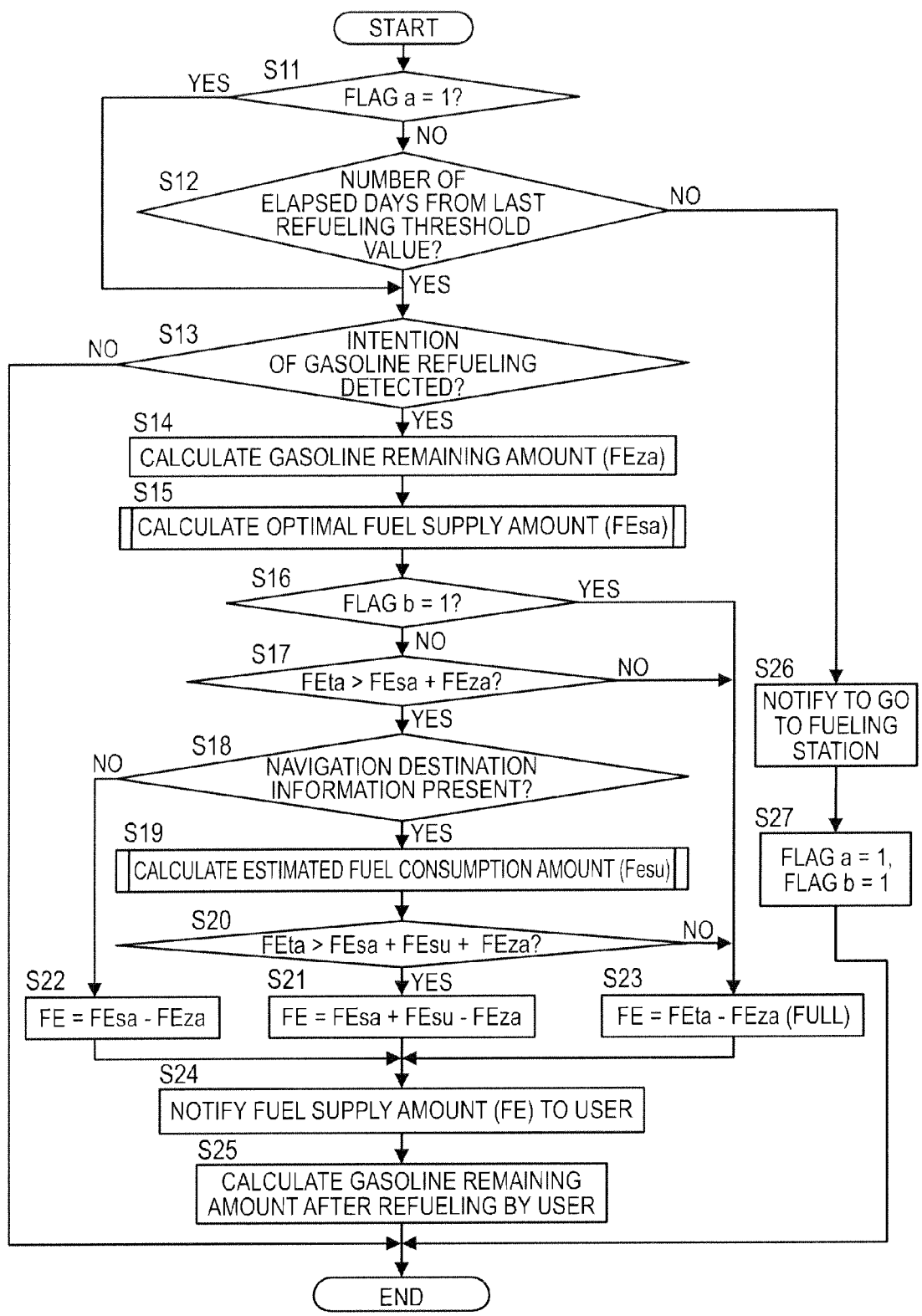
FIG. 3 is a flow chart showing a control logic for notifying a passenger of refueling in the electric vehicle according to the embodiment of the present invention.

FIG. 3 is a flow chart showing a control logic for notifying a passenger of refueling in the electric vehicle 100 according to the embodiment of the present invention. It should be noted that the controller 31 includes two flags a, b and executes the control logic shown in FIG. 3 using these flags a, b. Values of these flags a, b are reset to 0 for every trip.

First, in Step S11, the controller 31 determines whether a condition of the flag a=1 is satisfied (S11). If the flag a=1 (YES in Step S11), a transition is made to Step S13. On the other hand, if the flag a≠1 (NO in S11), the controller 31 determines whether the number of elapsed days Td from the last refueling is smaller than a threshold value Tre (S12). This Step S12 is described using FIG. 4.

Figure 4:
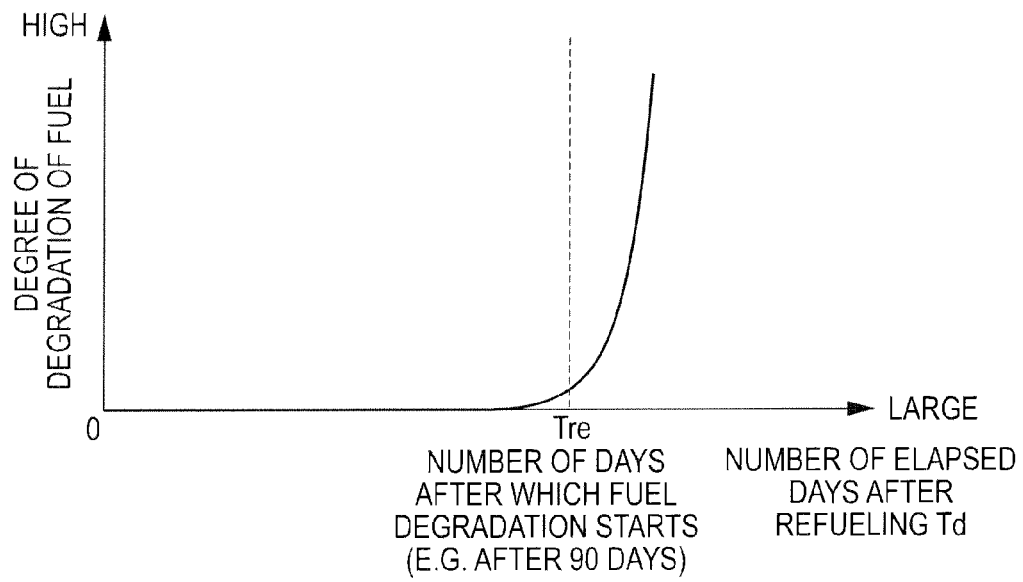
FIG. 4 is a graph showing a relationship between the number of elapsed days after refueling and a degree of degradation of fuel.

FIG. 4 is a graph showing a relationship between the number of elapsed days after refueling and a degree of degradation of fuel.

As shown in FIG. 4, the number of elapsed days Td after refueling has a property of increasing a degree of degradation of the fuel when becoming larger than a certain threshold number of days Tre (e.g. about 90 days as a guide). The degradation of the fuel means that the fuel in the fuel tank 14 is combined with oxygen in the same tank to be oxidized and degraded.

In the series-type plug-in hybrid vehicle as in the embodiment of the present invention, such oxidative degradation of the fuel occurs because fuel is unlikely to be consumed on weekdays in such a usage pattern in which this vehicle is charged every day and drives entirely in the EV driving mode on a journey to and from work.

The oxidative degradation of the fuel is explained. When the fuel tank is filled up, an air layer is smallest in the fuel and oxidative degradation is unlikely to occur. Further, since an antioxidant is in newly supplied fuel, the degree of degradation of fuel tends to decrease after refueling. Further, by using a sealed tank as the fuel tank 14, the oxidative degradation can be more effectively prevented since oxygen temperature in the fuel tank 14 does not change.

From the above, the threshold number of days Tre can be rephrased as the number of days during which the degradation of the fuel in the fuel tank 14 can be prevented and the performance of the fuel can be guaranteed. Thus, in Step S12 described above, whether or not the degree of degradation of the fuel is high is determined by comparing the elapsed days Td from the last refueling and the threshold value Tre. It should be noted that this threshold value Tre is desirably smaller than (not larger than) the number of days after which the degradation of the fuel starts.

Figure 5:
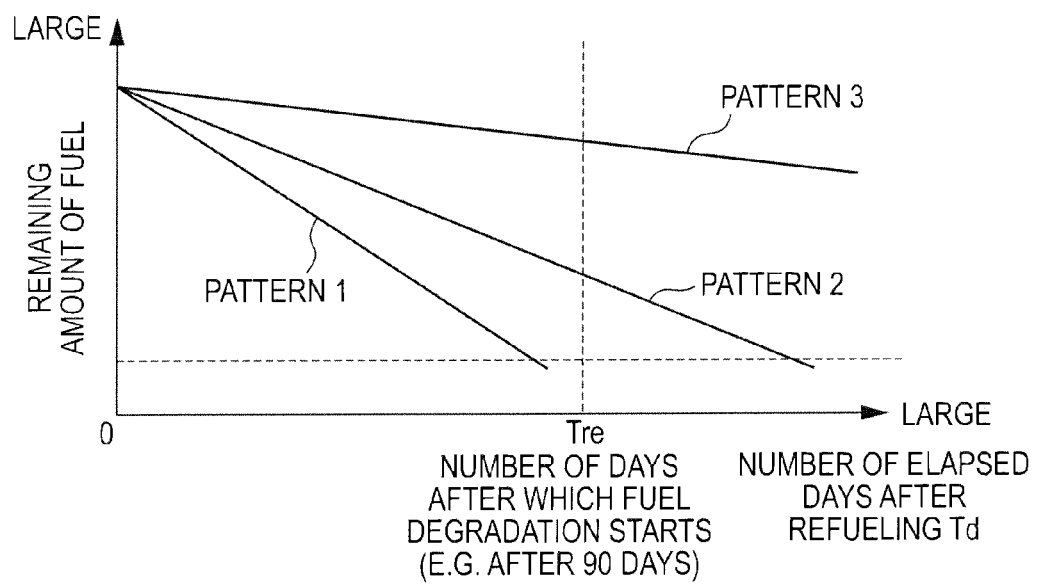
FIG. 5 is a graph showing a relationship between the number of elapsed days after refueling and the remaining amount of fuel.

FIG. 5 is a graph showing a relationship between the number of elapsed days after refueling and the remaining amount of fuel.

A pattern 1 shown in FIG. 5 indicates a case where the fuel in the fuel tank 14 can be consumed before the elapse of the threshold number of days Tre. In this case, notification to the driver is made only when refueling is necessary. This is a case of such a usage pattern in which the fuel is not degraded even if the fuel tank is filled up.

A pattern 2 shown in FIG. 5 indicates a case in such an environment where fuel degradation possibly occurs. In this case, notification to the driver is desirably made before the elapse of days after which the degradation starts.

A pattern 3 shown in FIG. 5 indicates a case in such an environment that fuel consumption is small and the fuel is most likely to be degraded since the vehicle drives mostly in the EV driving mode. In this case, similarly to the pattern 2, notification to the driver is desirably made before the elapse of days after which the degradation starts. Further, it is desirable to maximally fill the fuel.

It should be noted that, in the patterns 2 and 3 shown in FIG. 5, air (oxygen) is eliminated, for example, by filling up the fuel tank when 15 L of the fuel is consumed, whereby oxidation is suppressed. Further, since an antioxidant is in 15 L of newly supplied fuel, oxidation is suppressed.

Referring back to Step S12 of FIG. 3, if the number of elapsed days (Td) is smaller than the threshold value Tre (YES in S12), a transition is made to Step S13 since the fuel is not degraded. On the other hand, if the number of elapsed days is larger than the threshold value Tre (NO in S12), a transition is made to Step S26 since the fuel is degraded.

When a transition is made to Step S13, the controller 31 detects an intention of gasoline refueling (S13). The intention of gasoline refueling is determined to be present when the electric vehicle 100 is determined to be at a fueling station based on UPS information obtained by the navigation controller 25 or when the driver presses a filler opening open switch.

When the intention of gasoline refueling is detected (YES in S13), the controller 31 calculates the remaining amount (FEza, unit "L") of the fuel in the fuel tank 14 (S14). For example, the remaining amount of the fuel is calculated every time an ignition key is pulled out, but may be constantly calculated. Calculation methods for the remaining amount of the fuel include a calculating method based on the level of the fuel in the fuel tank 14 measured by the fuel tank sensor 27 (fuel level gauge) and the present gradient obtained by G sensor information, a calculation method for measuring the first level of the fuel in the fuel tank 14 after refueling is finished by the fuel tank sensor 27 (fuel level gauge) and calculating the remaining amount of the fuel based on the measured level of the fuel and a calculation value of the fuel consumption amount (FChev) during HEV driving, and the like.

Thereafter, the controller 31 calculates an optimal fuel supply amount (FEsa, unit "L") (S15). The optimal fuel supply amount is an optimal value of a fuel supply amount which is determined in consideration of a user's behavioral pattern (including a past vehicle use history) and can prevent the degradation of the fuel. A calculation method for the optimal fuel supply amount is specifically described using FIG. 7.

Thereafter, a transition is made to Step S16 and the controller 31 determines whether or not a condition of the flag b=1 is satisfied (S16). If the flag b=1 (YES in Step S16), a transition is made to Step S23. On the other hand, if the flag b≠1 (NO in S16), the controller 31 determines whether or not the tank capacity (maximum fuel capacity, FEta, unit "L") of the fuel tank 14 is larger than the sum of the remaining amount (FEza) of the fuel in the fuel tank 14 and the optimal fuel supply amount (FEsa) calculated in Step S15, i.e. whether or not the optimal fuel supply amount (FEsa) of the fuel can be supplied into the fuel tank 14 (S17).

If FEta>FEza+FEsa (YES in S17), i.e. if there is an empty space to supply the optimal fuel supply amount (FEsa) of the fuel in the fuel tank 14, a transition is made to Step S18. On the other hand, if FEta≤FEza+FEsa (NO in S17), i.e. if there is no empty space to supply the optimal fuel supply amount (FEsa) of the fuel in the fuel tank 14, the controller 31 sets FE=FEta−FEza, i.e. full tank as the fuel supply amount (FE) to be notified to the user (S23).

When a transition is made to Step S18, the controller 31 determines the presence or absence of navigation destination information in the navigation controller 25, i.e. whether or not a destination is set (S18). If the destination is set (YES in S18), the controller 31 calculates an estimated fuel consumption amount (FEsu, unit "L") (S19). The estimated fuel consumption amount (FEsu) is a fuel consumption amount to the destination estimated from the previous driving distance. A calculation method for the estimated fuel consumption amount is specifically described later using FIG. 8.

Thereafter, the controller 31 determines whether or not the tank capacity (FEta) of the fuel tank 14 is larger than the sum of the remaining amount of the fuel in the fuel tank 14, the optimal fuel supply amount (FEsa) calculated in Step S15 and the estimated fuel consumption amount (FEsu) calculated in Step S19, i.e. whether or not the optimal fuel supply amount (FEsa) and the estimated fuel consumption amount (FEsu) of the fuel can be supplied into the fuel tank 14 (S20).

If FEta>FEsa+FEsu+FEza (YES in S20), i.e. if there is an empty space to supply the optimal fuel supply amount (FEsa) and the estimated fuel consumption amount (FEsu) of the fuel in the fuel tank 14, the controller 31 sets FE=FEsa+FEsu−FEza as the fuel supply amount (FE unit "L") to be notified to the user (S21).

On the other hand, if FEta≤FEsa+FEsu+FEza (NO in S20), i.e. if there is no empty space to supply the optimal fuel supply amount (FEsa) and the estimated fuel consumption amount (FEsu) of the fuel in the fuel tank 14, the controller 31 sets FE=FEta−FEza, i.e. full tank, as the fuel supply amount (FE) to be notified to the user (S23).

It should be noted that if the destination is not set (NO in S18), the controller 31 sets FE=FEsa−FEza as the fuel supply amount (FE) to be notified to the user (S22).

A transition is made from Steps S21, S22 and S23 to Step S24 and the controller 31 notifies the fuel supply amount (FE) to the user (S24). Notification methods for the fuel supply amount include navigation audio guidance using the speaker 29, display on a navigation screen using the navigation controller 25, display on an indicator in a meter, a notification method via a mobile phone connected to the navigation controller 25, and the like.

Figure 6A:
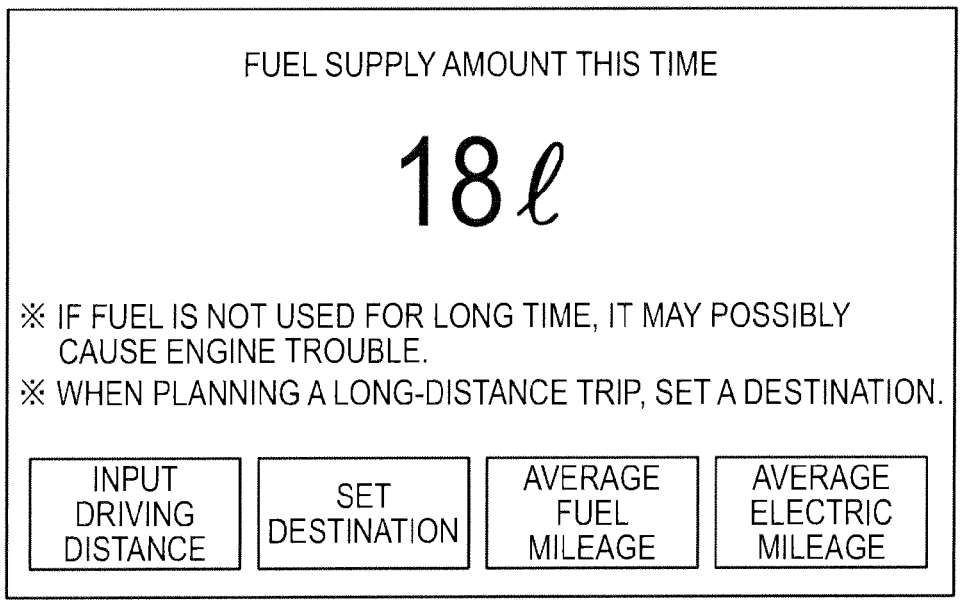
FIG. 6A is a diagram showing an example of a screen notifying a fuel supply amount calculated in the electric vehicle according to the embodiment of the present invention.
Figure 6B:
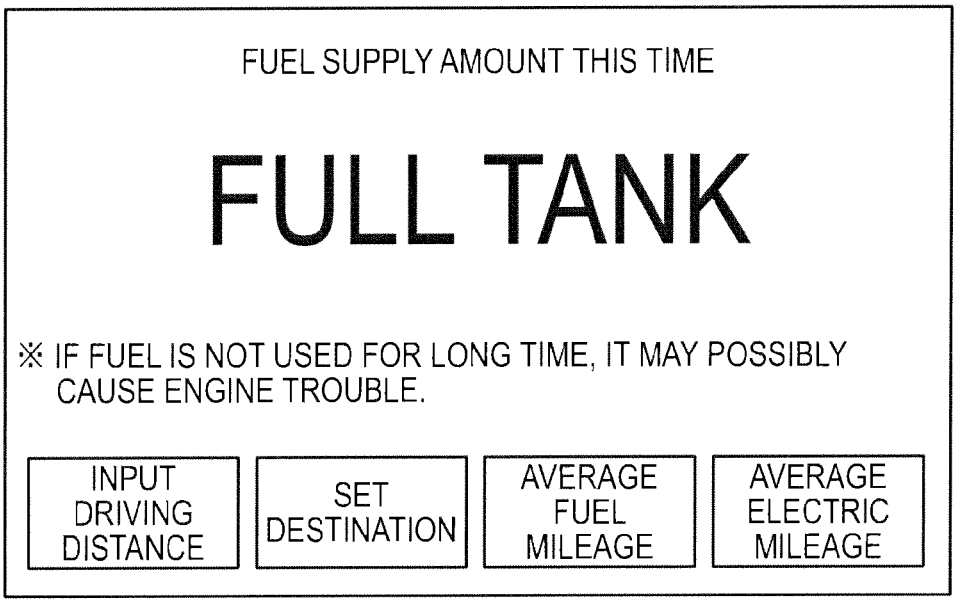
FIG. 6B is a diagram showing another example of the screen notifying the fuel supply amount calculated in the electric vehicle according to the embodiment of the present invention.

FIG. 6A is a diagram showing an example of a screen notifying the fuel supply amount calculated in the electric vehicle 100 according to the embodiment of the present invention. FIG. 6B is a diagram showing another example of the screen notifying the fuel supply amount calculated in the electric vehicle 100 according to the embodiment of the present invention.

A case of FIG. 6A is an example in which it is displayed on a navigation screen that 18 L of fuel should be supplied when the fuel supply amount (FE) is calculated in Step S21, S22. A case of FIG. 6B is an example in which it is displayed on the navigation screen that the fuel tank should be filled up when the fuel supply amount (FE) is calculated in Step S23.

Referring back to Step S25 of FIG. 3, the controller 31 calculates the remaining amount (FEza) of the fuel in the fuel tank 14 and stores it in the memory (S25) after refueling by the user.

It should be noted that the controller 31 notifies to refuel (S26) when a transition is made to Step S26 from NO in Step S12. Here, a notification method is similar to the one for the fuel supply amount described above. Further, after notification to the user, the controller 31 sets the respective flags a, b to 1 (S27). By this processing of Step S27, the determination result is invariably YES in Step S11 and no transition is made to Step S26 when a series of processings shown in FIG. 3 are performed again within the same trip. Thus, annoyance of the passenger caused by repeatedly performing the processing of Step S26 can be reduced. Similarly, if the series of processings shown in FIG. 3 are performed again within the same trip, the determination result is invariably YES in Step S16 and the full tank is subsequently set as the fuel supply amount (FE) to be notified to the user in Step S23. Thus, if the fuel is degraded, the degradation of the fuel can be suppressed by uniformly instructing to fill up the fuel tank.

By the process described above, the controller 31 notifies the fuel supply amount to be supplied or a refueling instruction to the effect of going to a fueling station to the passenger based on the number of elapsed days from the last refueling, the intention of gasoline refueling and the navigation destination information.

It should be noted that, by the processing of Step S13, the controller 31 notifies the fuel supply amount when the electric vehicle 100 is determined to be at a fueling station based on the GPS information obtained by the navigation controller 25. By notifying that the vehicle is shortly refueled only at a necessary timing in this way, annoyance of the passenger can be reduced.

Further, by the processing of Step S21, the controller 31 controls such that the fuel supply amount in the fuel tank 14 is the sum of the optimal fuel supply amount (FEsa) and the estimated fuel consumption amount (FEsu) to the destination. If a small amount of fuel (optimal fuel supply amount (FEsa)) is supplied in consideration of the fuel degradation, the frequency of the passenger to go to a fueling station is increased, which conversely results in annoyance, during long distance driving. Accordingly, if a destination is set, the supply of extra fuel that can be degraded in the fuel tank 14 can be prevented while annoyance of the passenger is reduced by notifying the fuel supply amount taking account of the estimated fuel consumption amount (FEsu) determined based on a distance to the destination. It should be noted that, although described in detail using FIG. 9, if a planned driving distance is input, the fuel supply amount taking account of an estimated fuel consumption amount (FEsu) determined based on the input planned driving distance may be notified.

Further, by the processing of Step S26, the controller 31 notifies that the vehicle should go to a fueling station even during driving if the number of elapsed days from the last refueling has exceeded a predetermined threshold number of days taking the fuel degradation into account. In this way, the degradation of the fuel can be avoided by notifying to refuel even if the fuel remains in the fuel tank 14 and there is no need to refuel.

Further, although the controller 31 notifies the fuel supply amount to be supplied or notifies to go to a fueling station to the passenger in the processings of Steps S24 and S26, a person to whom notification is made is not limited to the passenger and may be a staff at a fueling station.

Further, although the controller 31 notifies that the fuel supply amount to be supplied is a full tank in the processings of Steps S23 and S24, a fuel supply amount necessary for a full tank may be notified.

It should be noted that, in the processing of Step S26, the controller 31 may notify that the fuel supply amount to be supplied is a full tank instead of notifying to go to a fueling station. By notifying to fill up the fuel tank in this way, the amount of oxygen that degrades the fuel in the fuel tank 14 can be reduced and the oxidation of the fuel can be suppressed by an antioxidant contained in new fuel.

It should be noted that although the controller 31 notifies to go to a fueling station if the number of elapsed days from the last refueling exceeds the predetermined threshold number of days taking the fuel degradation into account in the processings of Steps S12 and S26, there is no limitation to this case. For example, notification to go to a fueling station may be made if the remaining amount of the fuel in the fuel tank 14 becomes less than a predetermined threshold value (e.g. broken line of FIG. 5) as before.

Figure 7:
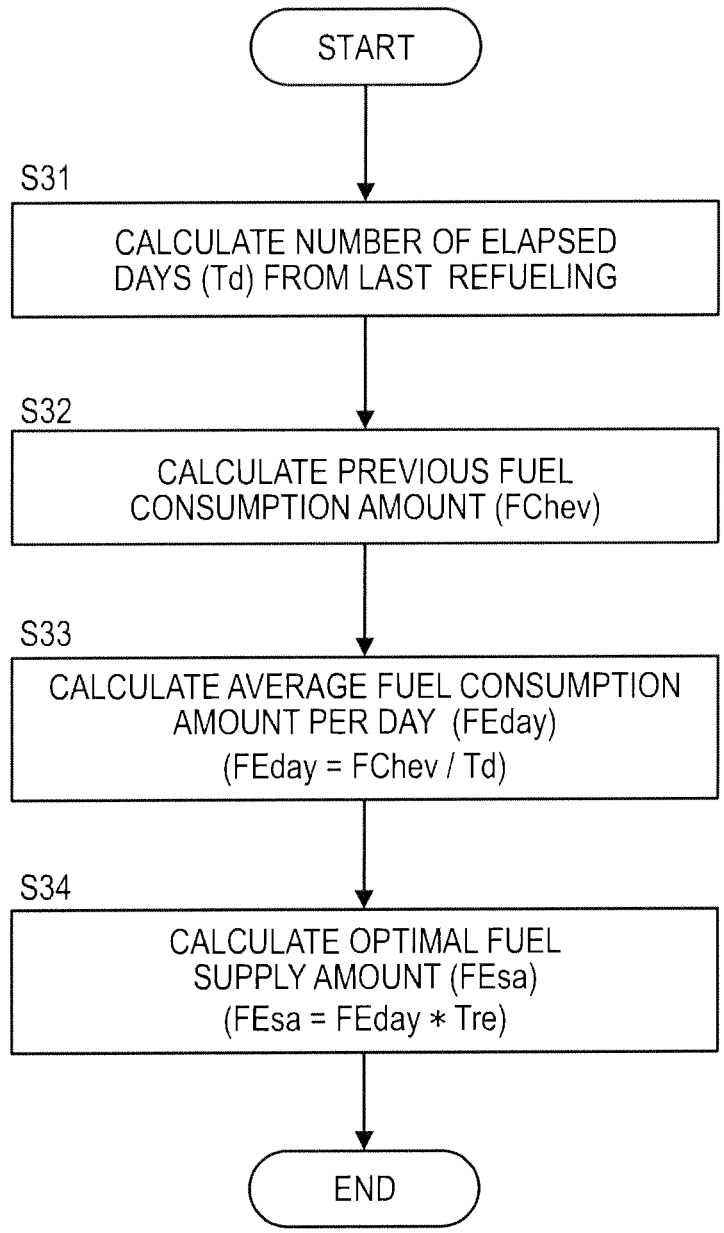
FIG. 7 is a flow chart showing a control logic for calculating an optimal fuel supply amount according to the embodiment of the present invention.

FIG. 7 is a flow chart showing a control logic for calculating the optimal fuel supply amount according to the embodiment of the present invention. Here, the calculation method for the optimal fuel supply amount shown in Step S15 of FIG. 3 is specifically described.

First, in Step S31, the controller 31 calculates the number of elapsed days (Td) from the last refueling (S31). Subsequently, in Step S32, the controller 31 calculates the previous fuel consumption amount (FChev) (S32). It should be noted that the number of elapsed days (Td) from the last refueling and the fuel consumption amount (FChev) are both calculated in Step 6 of FIG. 2.

Subsequently, in Step S33, the controller 31 calculates an average fuel consumption amount per day (FEday, unit "L/day") by dividing the fuel consumption amount (FChev) calculated in Step S32 by the number of elapsed days (Td) calculated in Step S31 (S43).

Figure 8:
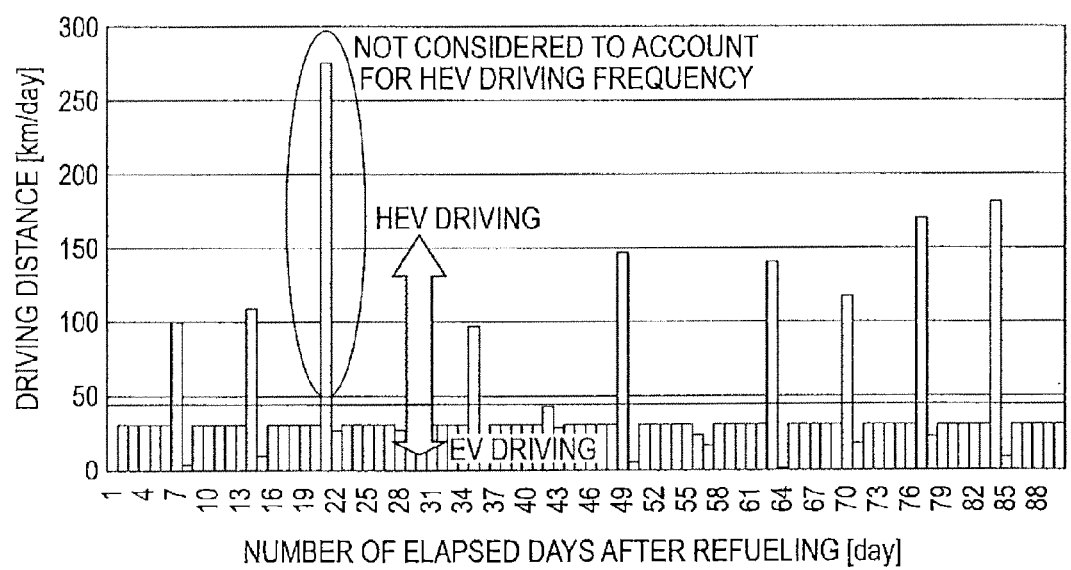
FIG. 8 is a graph for explaining a calculation method for an average fuel consumption amount according to the embodiment of the present invention.

FIG. 8 is a graph for explaining a calculation method for the average fuel consumption amount according to the embodiment of the present invention. FIG. 8 shows a relationship of the number of elapsed days (day) after refueling and driving distances (km/day) in the EV driving mode and the HEV driving mode.

As shown in FIG. 8, irregular driving histories may be present in a past use history. For example, the driving distance in the HEV drive mode is outstandingly long on the 21$^{st}$ day after refueling in the number of elapsed days. If the average fuel consumption amount is calculated in Step S43 taking account of such irregular running histories, the fuel consumption amount calculated based on the calculated average fuel consumption amount includes an error.

Accordingly, when calculating the average fuel consumption amount (FEday) in Step S33, the controller 31 desirably calculates the average fuel consumption amount (FEday) after excluding such irregular running histories. This enables an accurate calculation of the average fuel consumption amount and can prevent the supply of extra fuel that can be degraded in the fuel tank 14. It should be noted that although a vertical axis of FIG. 8 represents the driving distance per day, it may represent a driving distance per trip.

Referring back to Step S34 of FIG. 7, the controller 31 calculates the optimal fuel supply amount (FEsa) by multiplying the average fuel consumption amount (FEday) calculated in Step S33 and the aforementioned threshold number of days Tre (S34). This optimal fuel supply amount (FEsa) is the amount of the fuel necessary to maintain driving with the average fuel consumption amount (FEday) every day until the threshold number of days Tre elapses after refueling.

By the process described above, the controller 31 can calculate the optimal fuel supply amount (FEsa).

It should be noted that the controller 31 calculates the optimal fuel supply amount (FEsa) particularly based on the past use history (past fuel consumption amount, see FIG. 7) of the electric vehicle 100. Specifically, the fuel necessary to drive for the number of days (Tre) until the fuel is degraded after refueling is estimated based on the fuel consumption amount (FChev) obtained from the past vehicle use history and notification is made not to refuel too much at the time of refueling. In this way, the fuel can be consumed with usual fuel mileage before the fuel in the fuel tank 14 starts degrading.

Further, the controller 31 determines the fuel supply amount to be supplied in accordance with the control flow shown in FIG. 3 based on the optimal fuel supply amount (FEsa) obtained by a series of processings and necessary to drive for the number of days until the degradation of the fuel starts after refueling. This enables the fuel in the fuel tank 14 to be used up before the day on which the supplied fuel starts degrading. Thus, the supply of extra fuel that can be degraded in the fuel tank 14 can be prevented.

Further, the controller 31 calculates the optimal fuel supply amount (FEsa) based on the average fuel consumption amount per day (FEday) obtained from the number of elapsed days (Td) from the last refueling and the fuel consumption amount (FChev) used for HEV driving for that number of days, and the threshold number of days (Tre) until the degradation of the fuel starts after refueling. This enables the fuel in the fuel tank 14 to be consumed before the supplied fuel starts degrading. Thus, the supply of extra fuel that can be degraded in the fuel tank 14 can be prevented.

Figure 9:
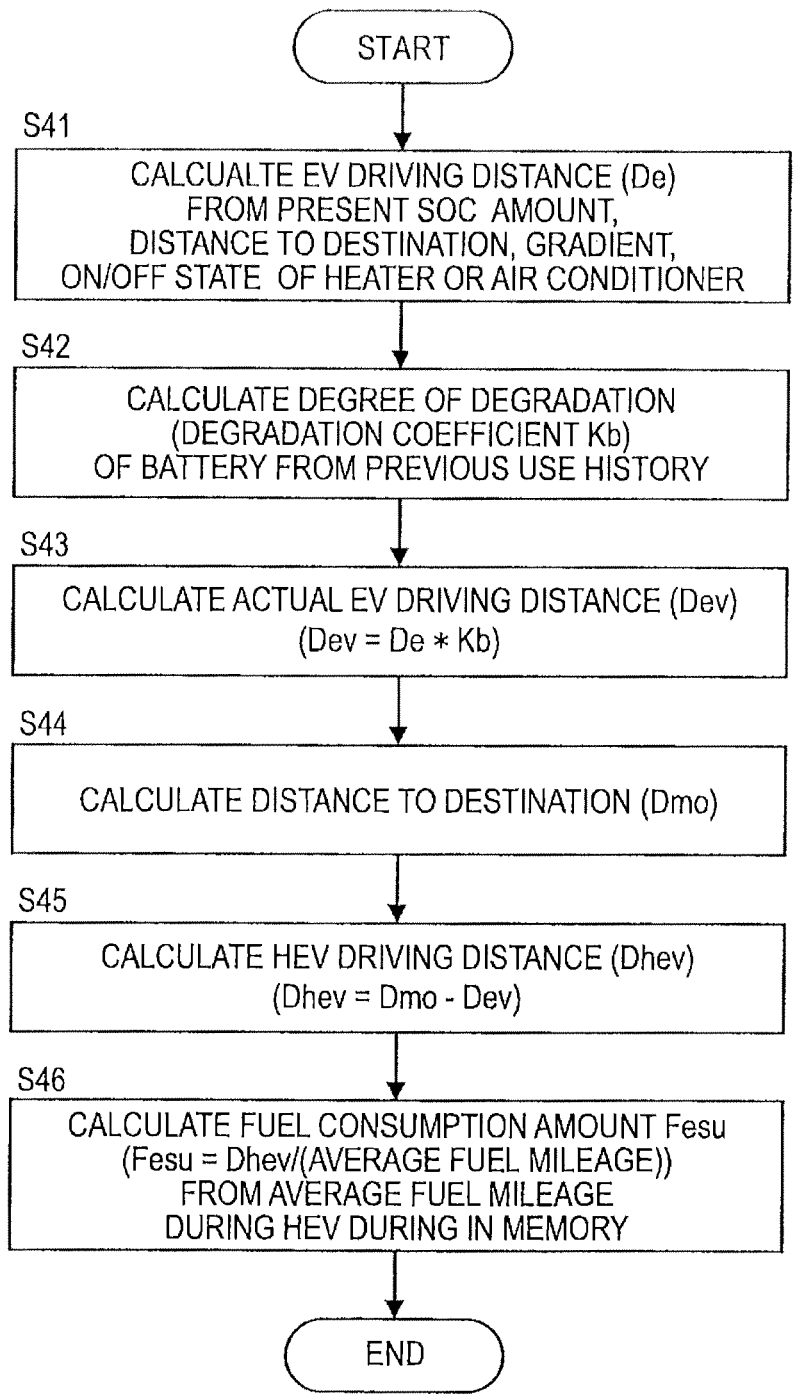
FIG. 9 is a flow chart showing a control logic for calculating an estimated fuel consumption amount according to the embodiment of the present invention.

FIG. 9 is a flow chart showing a control logic for calculating the estimated fuel consumption amount according to the embodiment of the present invention. Here, a calculation method for the estimated fuel consumption amount shown in Step 19 of FIG. 3 is specifically described.

First, in Step S41, the controller 31 calculates a distance to empty in the EV driving mode (De, unit "km") when the high-current battery 4 is not degraded, based on the present remaining capacity SOC of the high-current battery 4, a distance to a destination, the gradient of a road to the destination and an on/off state of a heater or an air conditioner.

Subsequently, in Step S42, the controller 31 calculates a degradation coefficient (Kb) indicating a degree of degradation of the high-current battery 4 from the previous use history (S42). The degradation coefficient Kb indicates a decrease relative to the distance to empty in the EV driving mode (De) when the high-current battery 4 is not degraded. It should be noted that the "previous use history" mentioned in Step S42 is a history of degradation over time determined from the amount of power taken out from the high-current battery 4, time and the like in the past driving.

Subsequently, in Step S43, the controller 31 calculates a distance to empty in the EV driving mode (Dev, unit "km")

taking into account a case where the high-current battery 4 is degraded by multiplying the distance to empty (De) calculated in Step S41 and the degradation coefficient (kb) calculated in Step S42 (S43).

Subsequently, in Step S44, the controller 31 calculates a distance to the destination (Dmo, unit "km") based on the destination set in the navigation controller 25 (S44).

Subsequently, in Step S45, the controller 31 calculates a driving distance in the HEV driving mode (Dhev, unit "km") by subtracting the distance to empty in the EV driving mode (Dev) calculated in Step S43 from the distance to the destination (Dmo) calculated in Step S44 (S45).

Subsequently, in Step S46, the controller 31 calculates the estimated fuel consumption amount (FEsu) by dividing the driving distance in the HEV driving mode (Dhev, unit "km") calculated in Step S45 by the average fuel mileage (see the description of Step S6 of FIG. 2, unit "km/L") during HEV driving stored in the memory (S46).

By the process described above, the controller 31 can calculate the estimated fuel consumption amount (FEsu).

It should be noted that, by a series of processings, the controller 31 calculates the distance to empty in the EV driving mode (Dev) using the degradation coefficient (Kb) indicating a degree of degradation of the high-current battery 4 and calculates the estimated fuel consumption amount (FEsu) based on the driving distance in the HEV driving mode (Dhev) obtained by subtracting the distance to empty in the EV driving mode (Dev) from the distance to the destination (Dmo). By using the distance to empty in the EV driving mode (Dev) taking account of the degraded state of the high-current battery 4, a more accurate driving distance in the HEV driving mode (Dhev) can be estimated. Further, the estimated fuel consumption amount (FEsu) can be calculated in consideration of the estimated driving distance (Dhev). Thus, the fuel supply amount to be supplied can be more accurately notified and the supply of extra fuel that can be degraded in the fuel tank 14 can be prevented while annoyance of the passenger is reduced.

Further, although the controller 31 calculates the distance to the destination (Dmo) based on the destination set in the navigation controller 25 in the processing of Step S44, there is no limitation to this case. For example, the passenger may be prompted to input a planned driving distance to the input device provided in the navigation controller 25 and the planned driving distance input by the passenger may be set as the distance to the destination (Dmo). In this case, the fuel supply amount in consideration of an accurate planned driving distance can be notified by prompting the passenger to input the planned driving distance before the fuel supply amount to be supplied is notified.

Although this invention has been described by way of the specific embodiment above, this invention is not limited to the above embodiment. It is possible for a person skilled in the art to modify or alter the above embodiment in various manners within the technical scope of the present invention.

For example, although the electric vehicle 100 has been described as an example in the above embodiment, the vehicle may be an ordinary vehicle using only an engine as a drive source. Since there is no EV driving mode in the case of an ordinary vehicle, an estimated fuel consumption amount (FEsu) may be simply calculated based on a distance to a destination (Dmo) and average fuel mileage of an engine.

For the above description, the contents of Japanese Patent Application No. 2010-166837 filed on Jul. 26, 2010 are hereby incorporated by reference.

The invention claimed is:

1. A vehicle, comprising:
a fuel tank;
an engine to which fuel is supplied from the fuel tank; and
a control device;
wherein the control device:
calculates an amount of fuel to be supplied based on a first estimated fuel consumption amount necessary to drive for a predetermined number of days until degradation of the fuel starts after refueling; and
notifies a refueling instruction that the calculated amount of fuel should be supplied.

2. The vehicle according to claim 1, further comprising:
a motor which functions at least as a drive source; and
a battery which is rechargeable from outside;
wherein the control device switches between an EV driving mode in which the vehicle drives using only the motor and an HEV driving mode in which the vehicle drives using the motor and the engine based on a charge capacity of the battery.

3. The vehicle according to claim 2, wherein the control device calculates the first estimated fuel consumption amount based on an average fuel consumption amount per day involved in driving in the HEV driving mode for a period up to the present after the last refueling and the predetermined number of days until the degradation of the fuel starts after refueling.

4. The vehicle according to claim 3, wherein the control device calculates the average fuel consumption amount per day based on driving histories excluding a driving history exceeding a predetermined driving distance per trip when calculating the average fuel consumption amount per day involved in driving in the HEV driving mode.

5. The vehicle according to claim 1, further comprising an input means for inputting a planned driving distance, wherein the control device:
calculates the amount of fuel to be supplied by subtracting the remaining amount of fuel stored in the fuel tank from the sum of a second estimated fuel consumption amount calculated based on the planned driving distance input by the input means and the first estimated fuel consumption amount, and
notifies a refueling instruction that the calculated amount of fuel should be supplied.

6. The vehicle according to claim 5, wherein the control device prompts a passenger to input the planned driving distance before notifying the refueling instruction.

7. The vehicle according to claim 5, further comprising a navigation controller capable of setting a destination, wherein:
the control device sets a driving distance to the destination calculated by the navigation controller as the planned driving distance.

8. The vehicle according to claim 7, wherein the control device notifies the refueling instruction when the vehicle is determined to be at a fueling station based on GPS information obtained by the navigation controller.

9. The vehicle according to claim 5, further comprising:
a motor which functions at least as a drive source; and
a battery which is rechargeable from outside;
wherein the control device:
switches between an EV driving mode in which the vehicle drives using only the motor and an HEV driving mode in which the vehicle drives using the motor and the engine based on a charge capacity of the battery;

estimates a distance to empty in the EV driving mode based on a degree of degradation of the battery calculated from the driving history of the vehicle;

calculates a driving distance in the HEV driving mode by subtracting the estimated distance to empty in the EV driving mode from the planned driving distance; and calculates the second estimated fuel consumption amount based on the calculated driving distance in the HEV driving mode.

10. The vehicle according to claim 1, wherein the control device notifies a refueling instruction to the effect of going to a fueling station if the predetermined number of days until the degradation of the fuel starts after the last refueling have elapsed.

11. The vehicle according to claim 1, wherein the control device notifies a refueling instruction to the effect of full tank refueling if the predetermined number of days until the degradation of the fuel starts after the last refueling have elapsed.

* * * * *